United States Patent
Gupta et al.

[19]

[11] Patent Number: 5,859,685
[45] Date of Patent: Jan. 12, 1999

[54] ACHROMATIC OPHTHALMIC LENSES

[75] Inventors: Amitava Gupta, Bethesda, Md.;
Ronald D. Blum, Roanoke, Va.;
Thomas R. Sloan, Greensboro, N.C.;
Venkateshwar Sekharipuram, Roanoke, Va.

[73] Assignee: Innotech, Inc., Roanoke, Va.

[21] Appl. No.: 683,297

[22] Filed: Jul. 18, 1996

[51] Int. Cl.⁶ ............................. G02C 7/02; B29D 11/00
[52] U.S. Cl. .......................... 351/159; 264/2.7; 351/166; 351/177
[58] Field of Search ................. 359/159, 166, 359/177; 264/2.7

[56] References Cited

U.S. PATENT DOCUMENTS

| | | |
|---|---|---|
| 4,577,942 | 3/1986 | Frieder et al. ................... 351/159 |
| 4,679,918 | 7/1987 | Ace ................................ 351/163 |
| 5,147,585 | 9/1992 | Blum ............................... 264/1.4 |
| 5,178,800 | 1/1993 | Blum ............................... 264/1.4 |
| 5,219,497 | 6/1993 | Blum ............................... 264/1.4 |
| 5,253,111 | 10/1993 | Chiba et al. .................... 351/166 |
| 5,512,371 | 4/1996 | Gupta et al. .................... 428/412 |

*Primary Examiner*—Scott J. Sugarman

[57] ABSTRACT

A compound ophthalmic lens having improved chromatic aberration is provided which includes a polymerized resin superstrate lens formed on a substrate lens. The chromatic dispersion characteristics of the resin, as well as its refractive index, are matched to the substrate lens to obtain the desired Abbe number, lens power and thickness of the finished lens, and to render the interface between the substrate lens and the superstrate lens substantially invisible. The color dispersion of the substrate lens is compensated for by the superstrate lens which has a relatively low Abbe number and has an opposite power from the substrate lens.

30 Claims, 2 Drawing Sheets

ACHROMATIC OPHTHALMIC LENSES

FIELD OF THE INVENTION

This invention relates to ophthalmic lenses, and more particularly to achromatic ophthalmic lenses having an Abbe number which may exceed 60.

In addition, it describes a novel method to manufacture ophthalmic lenses from any optical material to obtain reduced color dispersion.

BACKGROUND OF THE INVENTION

Abbe number is a measure of color dispersion or chromatic aberration, which is caused by the fact that refractive indices of materials are wavelength dependent. Abbe number is generally defined as $(n_{\lambda_y}-1)/(n_{\lambda_1}-n_{\lambda_2})$ where $n_{\lambda_1}$ and $n_{\lambda_2}$ are the refractive indices at two different wavelengths, and $n_{\lambda_y}$ is the refractive index at a median wavelength, i.e., yellow. Ophthalmic (eyeglass) lenses made of glass or plastic and having Abbe numbers ranging from about 25–60, are generally relatively free of annoying color dispersion. Abbe numbers in the range of 40–60 are especially desired, because an ophthalmic lens (e.g., –4.00 D, 75 mm in optic diameter) with an Abbe number of 40 will produce 10 mm of image separation.

The angular separation between two different wavelengths increases with lens power. Generally, the color dispersion, is high for plastic materials which have refractive indices above 1.50. These materials often possess aromatic moieties with extended conjugation and high polarizability, with electronic absorption in the near ultraviolet wavelength range, which contribute to the refractive index. However, aromatic groups possessing electronic absorption bands near the visible wavelength range (400 nm–700 nm) generally lead to an increase in color dispersion of the material. An example of such a high refractive index material is polycarbonate of bisphenol A, which has a refractive index of about 1.58 and possesses other desirable properties, such as superior impact resistance. The Abbe number for this material is quite low, for example 28–32, depending on the end groups and processing methods. Therefore, while polycarbonate of bisphenol A is widely used as a material of choice for safety glasses, its use is largely limited to medium to low prescriptions because higher prescriptions cause an increase in color dispersion, and therefore lead to undesirable color separation in white images.

Prescriptions higher than +/–4.00 D generally require the use of other high index materials which are generally more costly than polycarbonate and do not have as good an impact resistance as polycarbonate. These high index materials have been developed with an improved color dispersion, but even the best of these high index materials, that is having a refractive index greater than 1.57, have Abbe numbers in the range of 30–50. The color dispersion of such materials is generally only marginally acceptable. People wearing eyeglasses made of these materials often experience chromatic aberration, especially at the periphery of their visual field, since off axis rays are more prone to chromatic aberration than axial rays close to the optical center.

The present invention includes a compound ophthalmic lens and a method of fabricating such a lens which permits the use of plastic or glass materials having a high refractive index and impact resistance, such as polycarbonate of bisphenol A or other materials, in making eyeglass lenses without sacrificing satisfactory integration of colors in the image, as measured by Abbe numbers in the range of about 40–100.

Accordingly, it is an object of the present invention to provide an ophthalmic lens with an Abbe number in the range of about 40–100, and preferably in the range of about 60–80.

It is another object of the present invention to provide a method of fabricating such a lens using a desired material having a high refractive index and impact resistance, such as polycarbonate of bisphenol A and diethylene glycol bisallyl carbonate (CR-39™), for fabrication of ophthalmic lenses.

DETAILS OF THE INVENTION

Figure 1:
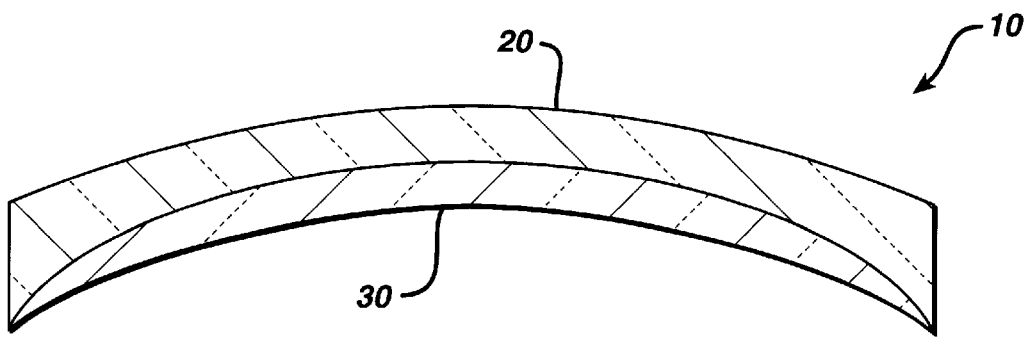
FIG. 1 is a cross-sectional view of an ophthalmic lens according to the present invention.
Figure 2:
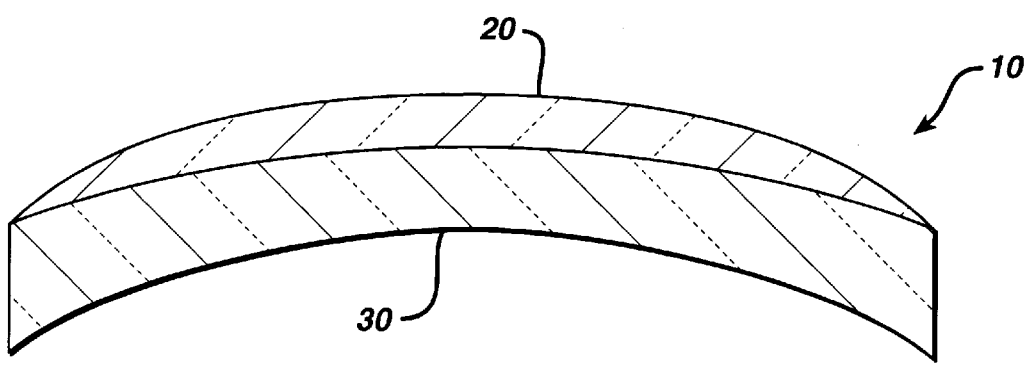
FIG. 2 is a cross-sectional view of another embodiment of an ophthalmic lens

As shown in FIGS. 1 and 2, an ophthalmic lens 10 with improved chromatic aberration is formed by applying a layer of a polymerizable resin 20 on the surface of a substrate lens 30 in order to form a superstrate lens of opposed power. The application of the resin layer 20 may be performed by casting as previously described in U.S. Patents issued to Blum (U.S. Pat. Nos. 5,178,800; 5,147,585; and 5,219,497). The finished lens 10 is formed by polymerizing a superstrate, optical layer 20 which provides an additional power on the surface of a substrate lens 30. The chromatic dispersion characteristics of the resin, as well as its refractive index, are carefully matched to the chromatic aberration characteristics (e.g., Abbe number) of the substrate lens in order to achieve the desired Abbe number of the finished lens, the final lens power and the desired lens thickness, and to render the interface between the substrate lens and the superstrate layer substantially invisible.

As an example, if the substrate lens 30 is a +4.00 D single vision lens made of polycarbonate of bisphenol A, with an Abbe number of 30, and the added resin layer 20 forms a concave lens of power equal to –1.00 D and has an Abbe number of 15, then the final lens 10 will have a power of +3.00 D and will have an Abbe number of about 45. In comparison, if the added layer forms a convex lens of power +1.00 D and has an Abbe number of 60, the final lens will have a power of +5.00 D and an Abbe number of about 33.3.

Thus: $q/a = p/b + (q-p)/c$; where p is the final power of the ophthalmic lens 10, b is the final Abbe number of the ophthalmic lens 10, q is the power of the substrate lens 30, a is the Abbe number of the substrate lens 30, and c is the Abbe number of the superstrate 20.

It is possible to compensate for the color dispersion of a substrate lens with an added layer of opposite power made of a material with a relatively low Abbe number, i.e., high color dispersion.

Suitable materials for the added resin layer 20 combine high color dispersions and low absorption in the visible wavelength range. In general, such materials have strong absorptions in the near ultraviolet region, arising from quantum mechanically allowed transitions, or strong vibronic bands (i.e., electronic transitions with strong coupling to a specific vibrational mode) in the near ultraviolet region. It is also desirable to have a relatively sharp electronic transition with a minimum Stoke's shift, so that the absorption band does not develop a significant tail into the visible region.

It has been found that polymerizable formulations containing styrenic derivatives, such a divinyl benzene, combine relatively low electronic absorption in the short wavelength visible region with a low Abbe number, i.e., strong color dispersion. Several liquid crystal polymers, containing di- or trisubstituted styrenic groups also exhibit such chromatic dispersion.

Figure 3:
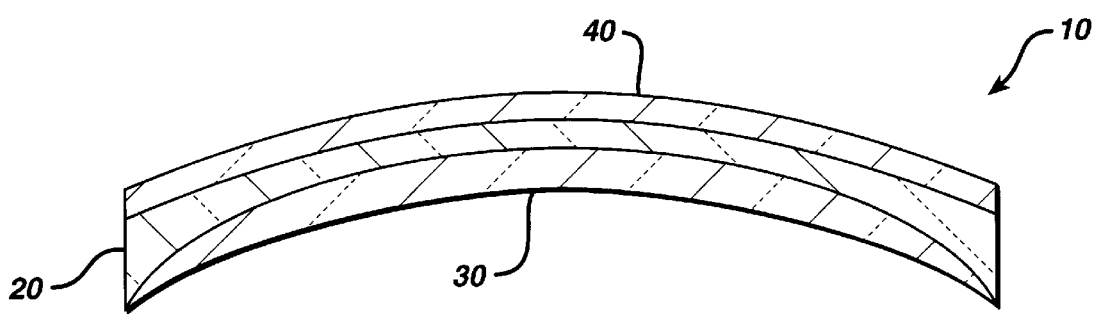
FIG. 3 is a cross-sectional view of an additional embodiment of an ophthalmic lens.

To fabricate a compound lens, a superstrate layer 20 of a polymerizable resin is applied on either the concave or convex surface of a substrate lens 30. The resin layer 20 may be applied on the surface of the substrate lens 30 by spinning, spraying, dipping, casting or a mold may be used to establish the final curvature required to obtain the desired power of the finished lens 10. The polymerized resin layer 20 should develop an optical contact with the substrate lens 30. The optical contact should be formed as a permanently bonded layer. The superstrate layer 20 is formed by polymerizing a resin formulation which may consist of allylics, acrylates, methacrylates, vinyl derivatives and styrenics. Also, as illustrated in FIG. 3, an additional superstrate layer 40 may be added to the opposite surface of the substrate lens 30.

The polymerization of the added superstrate layer or layers may be initiated by thermal or photochemically activated initiators. In all cases, it is necessary to match the refractive index of the added layer to that of the substrate layer to within 0.05 units; and, preferably within 0.03 units, in order to obtain an optical contact which renders the interface between the substrate and superstrate lenses invisible to the wearer of the lens.

The edge and center thickness of the compound lens 10 may be controlled by a variety of techniques which include varying the diameter of the added layer 20, aspherizing the added layer 20, aspherizing the substrate lens 30, introducing variation in the thickness of the added layer 20 in the form of a prism, or decentering the optical center of the added layer 20 with respect to the optical center of the added layer, i.e., by introducing an added prism into the lens. It is also possible to use an added layer of higher refractive index in order to achieve the desired level of correction with a thinner added layer.

In a preferred embodiment, the substrate lens 30 is made of polycarbonate of bisphenol A, and the polymerizable resin layer is a mixture of styrene, divinyl benzene, and mono and diacrylate derivatives of bisphenol A. The substrate lens 30 has a higher spherical power than the added polymerized layer 20. The substrate lens 30 is positive and the added layer 20 is a negative lens. In addition, the substrate lens is spherical in geometry, while the added layer may be toric. Both lenses may be aspherized in order to minimize spherical aberration, and reduce lens thickness.

In another embodiment, the substrate lens 30 is made of polycarbonate of bisphenol A, and has minus geometry, while the added layer 20 provides plus correction. The added layer 20 is deposited by means of a mold, which imparts the overall radius of curvature of the surface and provides an add power region (not shown). In this case, the add power region of the finished lens 10 has an even lower color dispersion than the part of the finished lens designed to provide distance correction. The added layer 20 is formed by polymerizing a resin formulation which comprises acrylates, methacrylates, vinyl derivatives or styrenics; all preferably incorporating aromatic moeties or groups which make a contribution of about 15 incremental units or more ($R_j$, cm$^3$/mol) to the total molar refraction.

In another embodiment, the substrate lens 30 is made of CR-39™, and the added layer 20 is formed by polymerizing:

i) a resin formulation acrylate, such as phenyl ethyl acrylate, ii) a monofunctional styrenic, such as vinyl anisole, and iii) a difunctional styrenic derivative, such as divinyl benzene, so that the refractive index of the final formulation is not greater than about 1.53, when the resin is fully polymerized. It has been found that a refractive index mismatch of greater than about 0.05 units between the substrate lens 30 and the added layer 20 will cause reflection of images from the interface to become visible, or ghost images to appear. For improved results, it is desirable to maintain the mismatch of refractive indices to not more than about 0.03 units. It is also possible to reduce the deleterious effects of the mismatching of refractive indices by interposing an intermediate zone of one or more layers (not shown) between the added resin layer and the substrate lens, with the intermediate zone having an effective refractive index which is approximately the geometric mean of the refractive indices of the substrate lens and the added layer.

These and other possible applications of the concept will become clear through the consideration of the following example, which is meant to be illustrative in nature, only, and is not meant to limit the scope of the claims in any manner.

EXAMPLE 1

A single vision lens is provided which is made of polycarbonate of bisphenol A. The lens has a power of +6.00 D and possesses a front curve of 8.21 D, a back curve of 2.12 D, an optic diameter of 71 mm, and an edge thickness of 1.0 mm. The lens is placed in a glass mold of curvature equal to 5.65 D, and the intervening space is filled with a liquid polymerizable resin consisting of bisphenol A diacryolate (25%), divinyl benzene (10%), dibromo cinnamate (5%), ethoxylated bisphenol A diacryolate (25), pentaerythrytol tetraacrylate (4%), phenoxyethyl acrylate (28%) and a photoinitiator such as Durcure 1173 (3%), available from Ciba Geigy. The resin is cured by application of UV radiation and heat, provided by separate sources. The temperature ramp varies from about 105° F. to 180° F. Total cure time is approximately 45 minutes. The intensity of the UV radiation is modulated during the initial 10 minutes of cure in order to ensure that the polymerization exotherm does not lead to an uncontrolled rise in temperature. The resulting lens has an Abbe number of approximately 55.

EXAMPLE 2

A single vision lens which is made of a copolymer of styrene, bisphenol A diacrylate, and bisallyl carbonate has a power of +6.00 diopters, a first curve of 8.12 diopters, a second curve of 6.12 diopters, a knife-edge, and an optic diameter of 71 mm. This lens material has an Abbe number of about 38. The lens is placed in a glass mold of concave curvature of 6.00 diopters. The cavity formed between the lens and the mold is filled with a resin of the following composition: styrene (40% w/v), 1,4-divinyl benzene (20% w/v), bisphenol A diacrylate (35% w/v), and Durcure 1173 (5%) available from Ciba-Gigy. The resin was cured by application of ultraviolet light at a temperature from about 100° F. to 200° F. over a period of about 40 minutes. The resulting lens was then demolded and had an Abbe nunber of about 80.

We claim:

1. An ophthalmic lens comprising:
   a substrate lens having a predetermined power and refractive index; and
   a superstrate lens, said superstrate lens having an opposite power and having a refractive index which is less than or equal to the refractive index of the substrate lens, wherein the Abbe number of the ophthalmic lens is higher than the Abbe number of the substrate lens and the superstrate lens.

2. The ophthalmic lens of claim 1, wherein the superstrate is formed by in situ polymerization of a liquid resin formulation on the surface of the substrate lens.

3. The ophthalmic lens of claim 1, further comprising an additional superstrate lens on an opposite surface of the substrate lens, wherein the ophthalmic lens has a higher Abbe number than either of the two superstrate lenses.

4. The ophthalmic lens of claim 1, wherein the Abbe number of the ophthalmic lens is at least about 40.

5. The ophthalmic lens of claim 4, wherein the Abbe number of the ophthalmic lens is from about 40 to about 100.

6. The ophthalmic lens of claim 5, wherein the Abbe number of the ophthalmic lens if from about 60 to abut 80.

7. The ophthalmic lens of claim 1, wherein the substrate lens and the superstrate lens are composed of different materials.

8. The ophthalmic lens of claim 7, wherein the substrate lens or the superstrate lens includes bisphenol A diacrylate or its oligomers.

9. The ophthalmic lens of claim 8, wherein the superstrate lens is formed from a mixture including styrene, divinyl benzene and mono and diacrylate derivatives of bisphenol A.

10. The ophthalmic lens of claim 9, wherein the substrate lens is positive and the superstrate lens is negative, the substrate lens having a higher spherical power than the superstrate lens.

11. The ophthalmic lens of claim 10, wherein the difference in refractive indices between the substrate lens and the superstrate lens is less than or equal to about 0.05 units.

12. The ophthalmic lens of claim 11, wherein the diference in the refractive indices between the substrate lens and the superstrate lens is less than or equal to about 0.03 units.

13. The ophthalmic lens of claim 7, wherein the substrate lens or the superstrate lens includes diethyl glycol bisallyl acrylate.

14. The ophthalmic lens of claim 1, wherein the ophthalmic lens has an Abbe number of at least about 50 and a refractive index of at least about 1.57.

15. The ophthalmic lens of claim 1, wherein the substrate is made of polycarbonate of bisphenol A.

16. The ophthalmic lens of claim 1, wherein the difference in refractive indices between the substrate lens and the superstrate lens is equal to or less than about 0.05 units.

17. The ophthalmic lens of claim 1, wherein the difference in refractive indices between the substrate lens and the superstrate lens is equal to or less than about 0.03 units.

18. A method of fabricating an ophthalmic lens comprising the steps of:

providing a substrate lens having a predetermined power and refiactive index;

depositing a polymerizable resin layer of uneven thickness on a surface of the substrate lens, wherein the resin layer is configured to form a lens of opposed power having a refractive index which is less than or equal to the refractive index of the substrate lens; and polymerizing the resin layer to form an ophthalmic lens, wherein the Abbe number of the ophthalmic lens is higher than the Abbe number of the substrate lens and the polymerized resin layer.

19. The method of claim 18, further comprising the steps of:

depositing an additional polymerizable resin layer of uneven thickness on an opposite surface of the substrate lens, wherein the additional resin layer is configured to have an opposed power as compared to the substrate lens: and polymerizing the additional resin layer, the polymerized resin layer having an Abbe number lower than the Abbe number of the ophthalmic lens.

20. The method of claim 18, wherein the Abbe number of the ophthalmic lens is at least about 40.

21. The method of claim 20, wherein the Abbe number of the ophthalmic lens is from about 40 to about 100.

22. The method of claim 21, wherein the Abbe number of the ophthalmic lens is about 60 to 80.

23. The method of claim 18, wherein the substrate lens and the polymerizable resin layer are composed of different materials.

24. The method of claim 23, wherein the substrate lens or the polymerizable resin layer includes bisphenol A diacrylate or its oligomers.

25. The method of claim 23, wherein the substrate lens or the polymerizable resin layer includes diethyl glycol bisallyl acrylate.

26. The method of claim 24, wherein the difference in refractive indices between the substrate lens and the polymerizable resin layer is less than or equal to about 0.03 units.

27. The method of claim 18 wherein the difference in refractive indices between the substrate lens and the polymerizable resin layer is less than or equal to about 0.05 units.

28. The method of claim 24, wherein the difference in refractive indices between the substrate lens and the polymerizable resin layer is less than or equal to about 0.05 units.

29. A new ophthalmic lens comprising:

a substrate lens having a predetermined power and refractive index; and a superstrate lens, said superstrate lens having an opposite power and having a refractive index which is less than or equal to the refractive index of the substrate lens;

wherein said superstrate lens is directly bonded to said substrate lens without utilizing an adhesive and wherein the Abbe number of the ophthalmic lens is higher than the Abbe number of the substrate lens and the superstrate lens.

30. A method of fabricating an ophthalmic lens, comprising the steps of:

providing a substrate lens having a predetermined power and refractive index;

depositing a polymerizable resin layer of uneven thickness on a surface of the substrate lens, wherein the resin layer is configured to form a lens of opposed power having a refractive index which is less than or equal to the refractive index of the substrate lens; and polymerizing the resin layer to form an ophthalmic lens, wherein said resin layer is directly bonded to said substrate lens without utilizing an adhesive and wherein the Abbe number of the ophthalmic lens is higher than the Abbe number of the substrate lens and the polymerized resin layer.

* * * * *